US012570157B2

(12) United States Patent (10) Patent No.: US 12,570,157 B2

Ubelhart (45) Date of Patent: *Mar. 10, 2026

(54) VEHICLE SYSTEM

(71) Applicant: Schaeffler Technologies AG & Co. KG, Herzogenaurach (DE)

(72) Inventor: Eric Ubelhart, Orrville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 175 days.

This patent is subject to a terminal disclaimer.

(21) Appl. No.: 18/593,015

(22) Filed: Mar. 1, 2024

(65) Prior Publication Data

US 2025/0065730 A1     Feb. 27, 2025

Related U.S. Application Data

(60) Provisional application No. 63/534,674, filed on Aug. 25, 2023.

(51) Int. Cl.
 B60L 15/20 (2006.01)
 H02P 27/06 (2006.01)
(52) U.S. Cl.
 CPC .............. B60L 15/20 (2013.01); H02P 27/06 (2013.01); *B60L 2240/421* (2013.01); *B60L 2240/423* (2013.01); *B60L 2250/28* (2013.01)

(58) Field of Classification Search
 None
 See application file for complete search history.

(56) References Cited

U.S. PATENT DOCUMENTS

2006/0244425 A1* 11/2006 Sihler ..................... H02P 9/105
 322/58
2013/0106330 A1* 5/2013 Schramm ............... H02P 21/05
 318/400.15

* cited by examiner

*Primary Examiner* — Hitesh Patel
*Assistant Examiner* — Wenyuan Yang
(74) *Attorney, Agent, or Firm* — Price Heneveld LLP

(57) ABSTRACT

A vehicle system includes: an electric axle assembly with an electric motor, a gear system, a differential, a half shaft, and a wheel; an input device that receives an input and outputs an initial throttle command; an electronic control module that receives the initial throttle command from the input device and outputs an adjusted throttle command; a first sensor that senses an output of the electric motor; a second sensor that senses an output of the wheel; and an inverter having control circuitry that receives the adjusted throttle command from the electronic control module and receives sensor data from the first and second sensors. The control circuitry controls power supplied to the electric motor based on the adjusted throttle command and the sensor data from the first and second sensors.

20 Claims, 4 Drawing Sheets

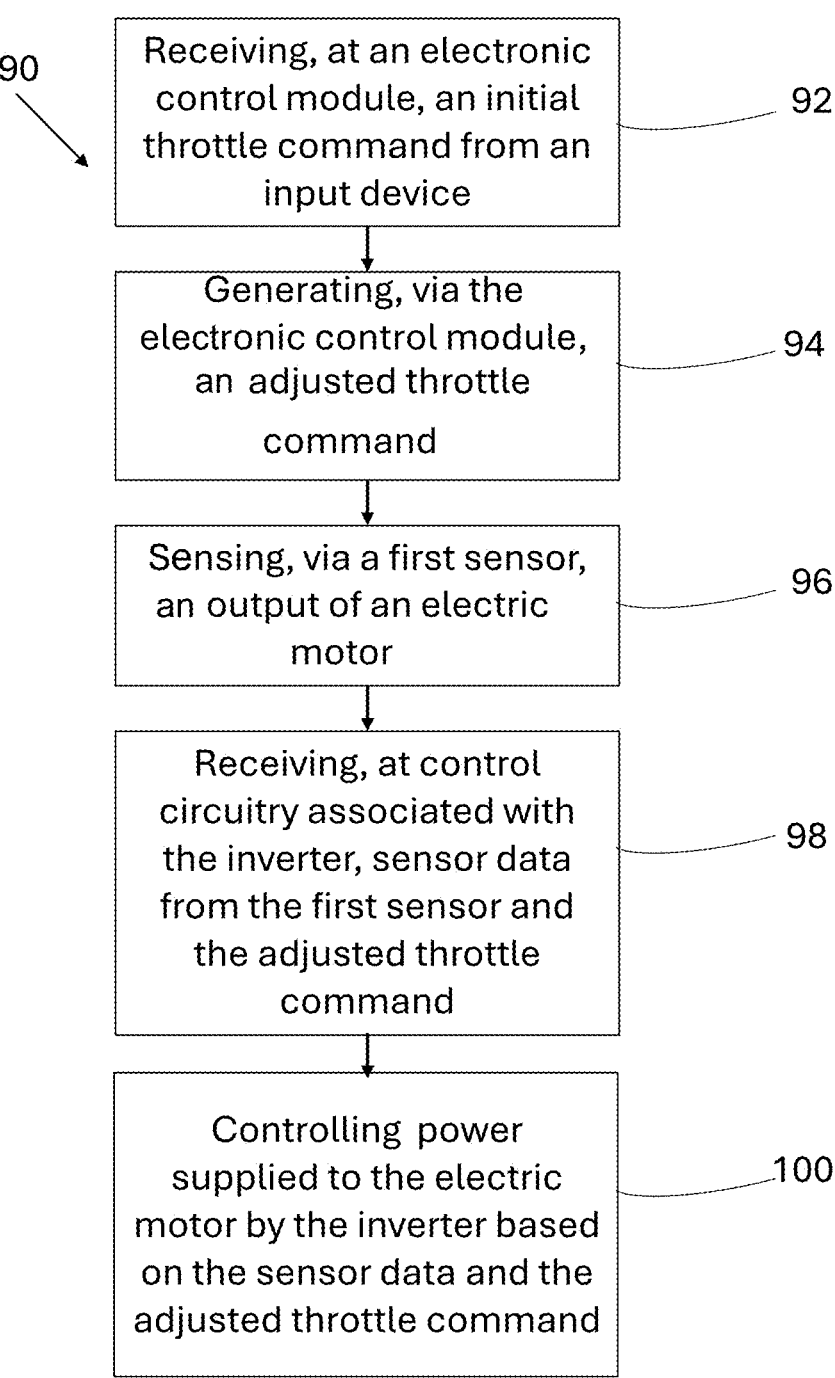

90

Receiving, at an electronic control module, an initial throttle command from an input device — 92

Generating, via the electronic control module, an adjusted throttle command — 94

Sensing, via a first sensor, an output of an electric motor — 96

Receiving, at control circuitry associated with the inverter, sensor data from the first sensor and the adjusted throttle command — 98

Controlling power supplied to the electric motor by the inverter based on the sensor data and the adjusted throttle command — 100

FIG. 4

VEHICLE SYSTEM

CROSS-REFERENCE TO RELATED APPLICATION

This application claims the benefit of priority under 35 U.S.C. § 119 of U.S. Provisional Application No. 63/534, 674, filed on Aug. 25, 2023, the entire contents of which are incorporated herein by reference.

FIELD OF THE DISCLOSURE

The present disclosure generally relates to a system for a vehicle that includes an electric motor. More specifically, the present disclosure relates to a system for a vehicle with an electric motor that adjusts an initial throttle command received from an input device, such as an accelerator pedal, and controls power supplied to the electric motor by the inverter based on the adjusted throttle command and sensor data received from at least one of a motor output sensor and a wheel output sensor.

BACKGROUND OF THE DISCLOSURE

Electric motors can deliver high torque almost instantaneously, unlike internal combustion engines. When the driver of an electric vehicle accelerates, the motor applies a significant amount of torque to the drivetrain. Axles and other drivetrain components are not perfectly rigid, such that they have some degree of elasticity. When subjected to the high torque from the electric motor, these components can twist slightly. This phenomenon is known as "torsional wind-up." Due to this torsional wind-up, there is a slight delay between when the motor applies torque and when the full effect of this torque is transmitted to the wheels of the vehicle. Initially, some of the torque goes into twisting the axle rather than rotating the wheels. As the axle twists, it stores elastic energy. Once the torque application exceeds the elastic limit of the axle, this stored energy is released, causing the wheels to rotate more rapidly than intended. This cycle of energy storage and release can lead to a periodic or oscillatory behavior in the vehicle. After the initial torque is applied and the axle twists, the subsequent release of stored energy can overshoot the required wheel speed. The control system then adjusts the torque downward, leading to a reduction in wheel speed. This adjustment can again be followed by torque wind-up, creating a repetitive cycle of acceleration and deceleration. These oscillations occur at a relatively low frequency and can be felt as a sort of pulsing or surging during acceleration.

Additionally, drivetrains have natural frequencies that, when reached due to certain operations of the vehicle, such as sudden application of torque from the electric motor during acceleration, cause unwanted vibration and/or oscillation of the drivetrain and vehicle. A vehicle system that mitigates these issues may be desired.

SUMMARY OF THE DISCLOSURE

According to a first aspect of the present disclosure, a vehicle system includes: an electric axle assembly that includes an electric motor, a gear system operably coupled with the electric motor via a rotor shaft, a differential operably coupled with the gear system, a half shaft operably coupled with the differential, and a wheel operably coupled with the half shaft; an input device that receives an input and outputs an initial throttle command responsively; an electronic control module that receives the initial throttle command from the input device and outputs an adjusted throttle command; a first sensor that senses an output of the electric motor; a second sensor that senses an output of the wheel; and an inverter having control circuitry that receives the adjusted throttle command from the electronic control module and receives sensor data from the first sensor and sensor data from the second sensor. The control circuitry controls power supplied to the electric motor based on the adjusted throttle command and the sensor data from the first and second sensors to counter torsional wind-up of the electric axle assembly.

Embodiments of the first aspect of the disclosure can include any one or a combination of the following features:

the control circuitry controls the power to counter torsional wind-up by adjusting the current supplied to the electric motor to adjust the torque applied by the electric motor based on the sensed output of the electric motor indicated by the sensor data of the first sensor relative to the sensed output of the wheel indicated by the sensor data of the second sensor;

the control circuitry controls the power by adjusting the current supplied to the electric motor to at least one of reverse the direction of the torque applied by the electric motor and adjust the magnitude of torque applied by the electric motor based on the sensor data of the first sensor and the sensor data of the second sensor indicating that the output of the electric motor is relatively ahead of the output of the wheel due to torsional wind-up of the electric axle assembly of the vehicle system;

the output of the wheel is at least one of speed, acceleration, and angular position; and the sensor data of the first sensor and the sensor data of the second sensor is communicated to the control circuitry of the inverter directly without first being relayed to the electronic control module from which the adjusted throttle command is received by the control circuitry.

According to a second aspect of the present disclosure, a vehicle system includes: an electric axle assembly that includes an electric motor, a gear system operably coupled with the electric motor via a rotor shaft, a differential operably coupled with the gear system, a half shaft operably coupled with the differential, and a wheel operably coupled with the half shaft; a first sensor that senses an output of the electric motor; a second sensor that senses an output of the wheel; and an inverter that supplies power to the electric motor and includes control circuitry that controls power supplied to the electric motor based on the sensed output of the electric motor and the sensed output of the wheel to adjust operation of the electric motor.

Embodiments of the second aspect of the disclosure can include any one or a combination of the following features:

the control circuitry controls the power to counter torsional wind-up by adjusting the current supplied to the electric motor to adjust the torque applied by the electric motor based on the sensed output of the electric motor relative to the sensed output of the wheel;

the control circuitry controls the power by adjusting the current supplied to the electric motor to at least one of reverse the direction of the torque applied by the electric motor and adjust the magnitude of torque applied by the electric motor based on sensor data of the first and second sensors indicating that the output of the electric motor is relatively ahead of the output of the wheel due to torsional wind-up of the electric axle assembly of the vehicle system;

an electronic control module that is configured to output a throttle command to the control circuitry of the inverter, wherein the control circuitry is configured to control the power supplied to the electric motor by the inverter based on the received throttle command and the sensed outputs of the electric motor and wheel, respectively;

an accelerator pedal that is configured to receive an input from a user of the vehicle system and output an initial throttle command to the electronic control module, wherein the throttle command output by the electronic control module is an adjusted throttle command based on the initial throttle command; and the first and second sensors respectively communicate sensor data to the control circuitry of the inverter directly without first relaying the sensor data to the electronic control module.

According to a third aspect of the present disclosure, a method of controlling movement of a vehicle, including the steps of: receiving, at control circuitry associated with an inverter of the vehicle, sensor data from a first sensor that senses an output of an electric motor of the vehicle; receiving, at the control circuitry associated with the inverter of the vehicle, sensor data from a second sensor that senses an output of a wheel of the vehicle; and controlling, with the control circuitry associated with the inverter, power supplied to the electric motor by the inverter based on the sensor data received from the first sensor and the sensor data received from the second sensor to counter torsional wind-up of an electric axle assembly that includes the electric motor.

Embodiments of the third aspect of the disclosure can include any one or a combination of the following features:

Controlling the power to counter torsional wind-up comprises adjusting the current supplied to the electric motor to at least one of reverse the direction of the torque applied by the electric motor and adjust the magnitude of torque applied by the electric motor;

receiving, at the control circuitry associated with the inverter, a throttle command from an electronic control module of the vehicle;

the control circuitry controls the power supplied to the electric motor by adjusting the current supplied to the electric motor to at least one of reverse the direction of the torque applied by the electric motor and adjust the magnitude of torque applied by the electric motor prior to the output of the wheel exceeding the output of the electric motor based on the sensor data received from the first sensor and the sensor data received from the second sensor;

the control circuitry controls the power supplied to the electric motor by adjusting the current supplied to the electric motor to at least one of reverse the direction of the torque applied by the electric motor and adjust the magnitude of torque applied by the electric motor prior to the output of the wheel exceeding the output of the electric motor based on the sensor data received from the first sensor and the sensor data received from the second sensor indicating that, relative to a point of torsional equilibrium of the electric axle assembly, the output of the electric motor is ahead of the output of the wheel;

both the sensor data received from the first sensor and the sensor data received from the second sensor is communicated between the control circuitry and the first and second sensors, respectively, without first being relayed to the electronic control module from which the throttle command is received by the control circuitry;

the throttle command is an adjusted throttle command that is based on an initial throttle command received at the electronic control module via an input device of the vehicle;

the input device is an accelerator pedal; and the electric axle assembly includes the electric motor and the wheel.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 4 is a diagram of a method of controlling movement of a vehicle.

Figure 1:
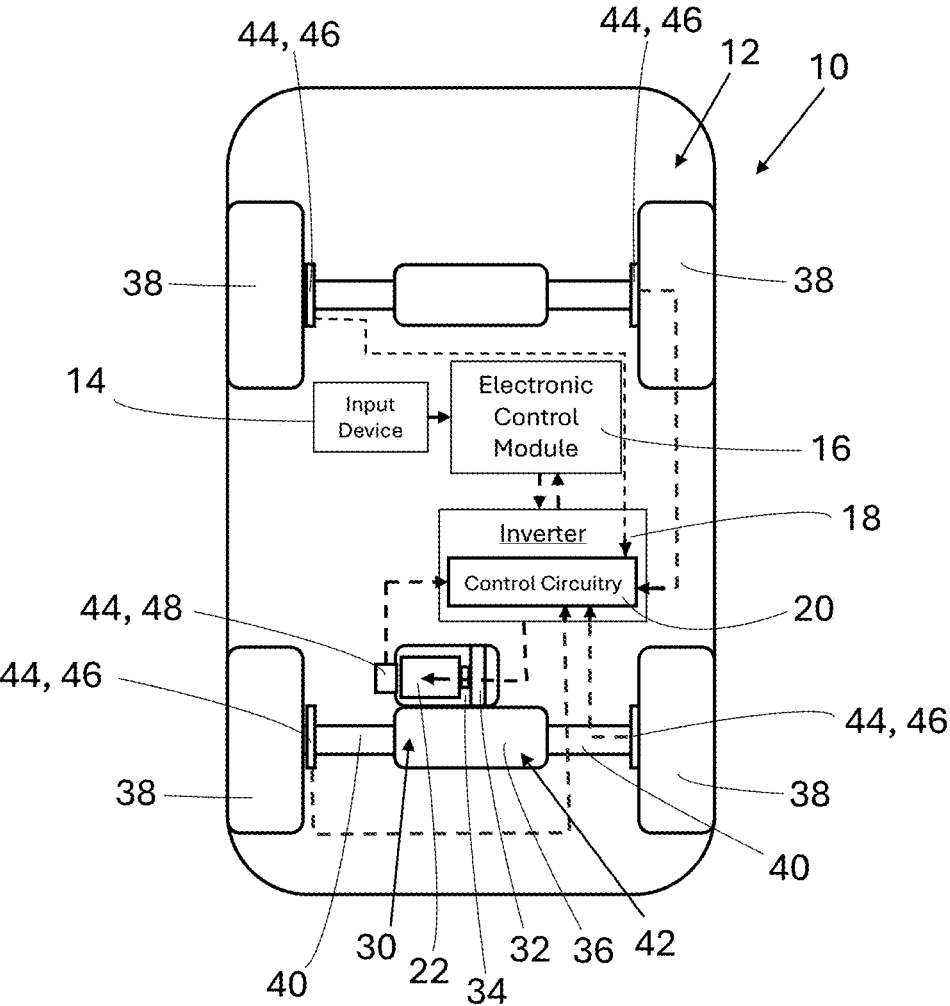
FIG. 1 is a schematic view of a vehicle, illustrating various components of the vehicle, including an electronic control module, an inverter, a plurality of sensors, and an electric axle assembly including an electric motor, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-4, a system 10 for a vehicle 12 includes an input device 14, an electronic control module 16, an inverter 18 with associated control circuitry 20, an electric motor 22, and a sensing system 24. The electronic control module 16 is configured to output a throttle command 26 to the control circuitry 20 of the inverter 18, the sensing system 24 is configured to output sensor data 28 pertaining to an output of one or more wheels 38 of the vehicle 12 and/or the output of the electric motor 22 of the vehicle 12 to the control circuitry 20 of the inverter 18, and the control circuitry 20 is configured to control power supplied to the electric motor 22 by the inverter 18 based on the received throttle command 26 and sensor data 28 to counter torsional wind-up of an electric axle assembly 30 of the vehicle 12.

Referring now to FIG. 1, the vehicle 12 includes the electric axle assembly 30. In various implementations, the electric axle assembly 30 includes the electric motor 22, a gear system 32 operably coupled with the electric motor 22 via a rotor shaft 34, a differential 36 operably coupled with the gear system 32, one or more half shafts 40 operably coupled with the differential 36, and one or more wheels 38 operably coupled with the one or more half shafts 40, respectively. The electric axle assembly 30 may form a drivetrain 42 of the vehicle 12 or a portion of the drivetrain 42 of the vehicle 12. It is contemplated that, in some embodiments, the vehicle 12 may include a plurality of electric axle assemblies 30 (e.g., front electric axle assembly and rear electric axle assembly) and that the electric axle assemblies 30 of the vehicle 12 may together form the drivetrain 42. It is further contemplated that the electric axle assembly 30 may cooperate with an internal combustion engine of a hybrid vehicle and that the internal combustion engine, electric axle assembly 30, and other associated components may form the drivetrain 42, in some implementations.

Figure 2:
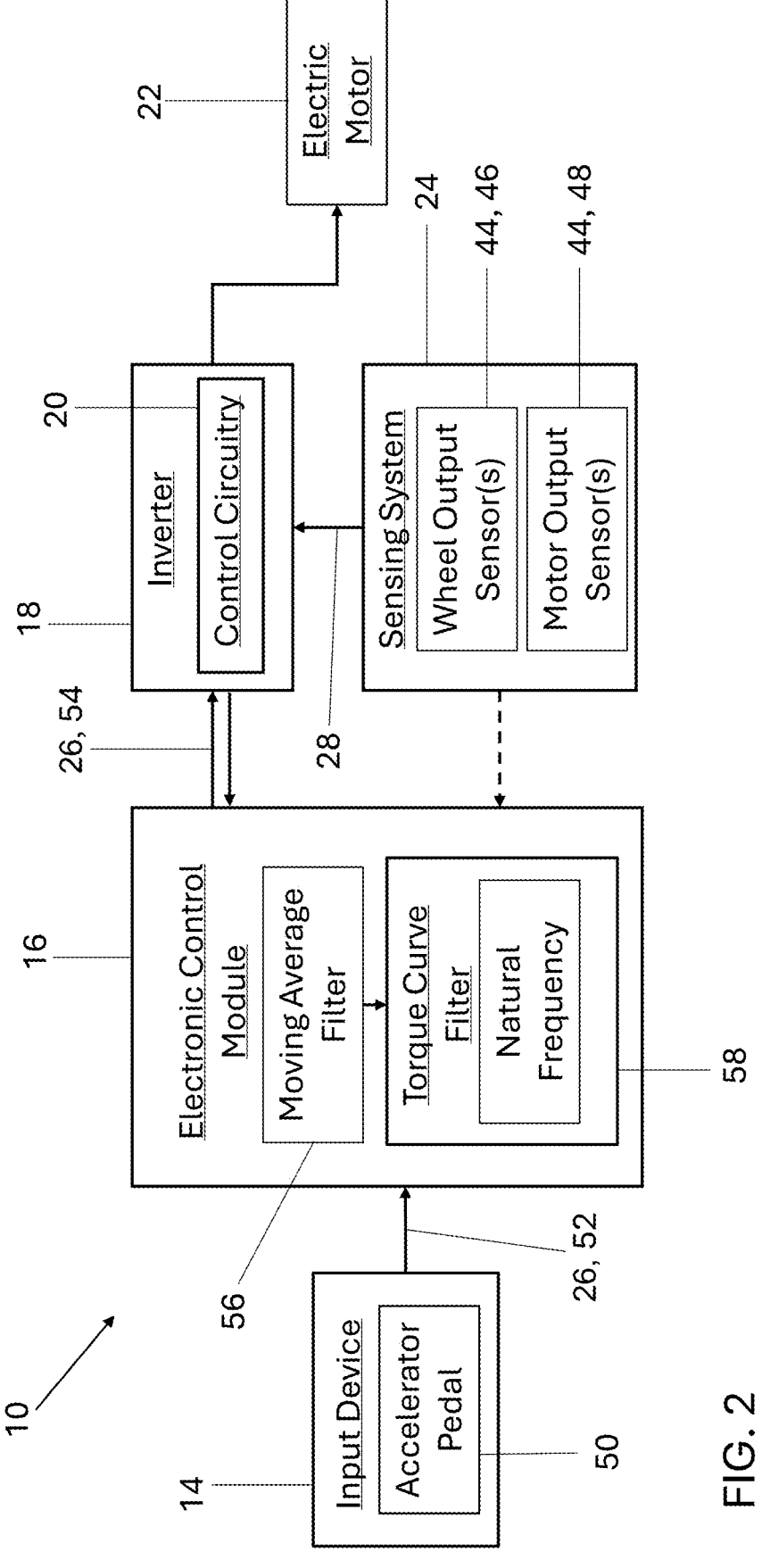
FIG. 2 is a block diagram of a vehicle system that includes an input device, an electronic control module, a sensing system, an inverter with associated control circuitry, and an electric motor, according to one embodiment.

Referring now to FIGS. 1 and 2, the system 10 of the vehicle 12 may include a sensing system 24. The sensing system 24 may include a plurality of sensors 44 and/or a plurality of types of sensors 44, in various embodiments. As illustrated in FIG. 2, the sensing system 24 can include a wheel output sensor 46. The wheel output sensor 46 is configured to sense an output of a wheel 38 of the vehicle 12. The wheel output sensor 46 may be operable to sense one or more of a variety of types of outputs of the wheel 38 of the vehicle 12, such as angular position of the wheel 38, speed of rotation of the wheel 38, and/or acceleration of rotation of the wheel 38. As illustrated in FIG. 1, the vehicle system 10 includes a plurality of wheel output sensors 46 corresponding with the plurality of wheels 38 of the vehicle 12.

Referring still to FIGS. 1 and 2, the sensing system 24 may include a motor output sensor 48. The motor output sensor 48 is configured to sense an output of the electric motor 22 in operation of the system 10 of the vehicle 12. It is contemplated that the motor output sensor 48 may be configured to sense one or more of a variety of types of outputs of the electric motor 22, including, but not limited to, speed of operation (e.g., rotation) of the motor 22, acceleration of the motor 22, angular position of the motor 22, and/or a combination thereof. The sensors 44 of the sensing system 24 are configured to output sensor data 28 to various components of the system 10 of the vehicle 12, as described further herein.

Referring still to FIGS. 1 and 2, the system 10 of the vehicle 12 includes the input device 14. The input device 14 is configured to receive an input and responsively output an initial throttle command 52 to the electronic control module 16. In various implementations, the input device 14 receives an input from a user of the vehicle 12. For example, in an exemplary embodiment, the input device 14 is an accelerator pedal 50 of the vehicle 12, and the accelerator pedal 50 receives an input from the user in the form of depression of the accelerator pedal 50 by the foot of the user. A variety of types of input devices 14 are contemplated (e.g., joystick, lever, etc.). Further, it is contemplated that the input device 14 may be a feature of an autonomous vehicle that receives an input in the form of data rather than a physical maneuver of a user of the vehicle 12.

Referring still to FIGS. 1 and 2, the system 10 includes the electronic control module 16. The electronic control module 16 is configured to receive the initial throttle command 52 and generate an adjusted throttle command 54 that is output to the control circuitry 20 of the inverter 18, as described further herein. The electronic control module 16 generates the adjusted throttle command 54 by processing the initial throttle command 52 via the application of one or more filters to the initial throttle command 52. For example, in various implementations, a moving average filter 56 may be applied to the initial throttle command 52 to ensure a smoother throttle command curve. In some implementations, the electronic control module 16 may filter the initial throttle command 52 (either raw or as modified by the moving average filter 56) based on at least one natural frequency (e.g., fundamental frequency, harmonic frequency) of the drivetrain 42 of the vehicle 12. Filtering the throttle command 26 in this way via a torque curve filter 58 concerning at least one natural frequency of the drivetrain 42 advantageously lessens and/or prevents torsional excitation oscillations of the drivetrain 42 during operation of the vehicle system 10. Application of the one or more filters to the initial throttle command 52 by the electronic control module 16 results in the adjusted throttle command 54 that is output to the control circuitry 20 associated with the inverter 18 of the system 10.

Referring now to FIGS. 1 and 2, the control circuitry 20 of the inverter 18 is configured to receive the adjusted throttle command 54 from the electronic control module 16 and sensor data 28 from the sensing system 24 and responsively control power supplied by the inverter 18 to the electric motor 22 of the drivetrain 42. In various implementations, the inverter 18 is configured to convert direct current from a power source, such as a battery of the vehicle 12, to alternating current that is conveyed to the electric motor 22. The power supplied to the electric motor 22 from the inverter 18 has a waveform that is dictated by the voltage and current supplied to the electric motor 22 from the inverter 18. In various embodiments, torque applied by the motor 22 corresponds with current supplied to the electric motor 22 by the inverter 18. As such, adjustment of the magnitude and timing of current supplied to the electric motor 22 adjusts the torque applied by the electric motor 22 during operation of the vehicle 12. In various implementations, the control circuitry 20 of the inverter 18 controls power supplied by the inverter 18 to the electric motor 22 by controlling the waveform of the power.

Referring still to FIGS. 1 and 2, in some embodiments of the system 10 of the vehicle 12, the control circuitry 20 associated with the inverter 18 controls the power supplied to the electric motor 22 of the drivetrain 42 from the inverter 18 based on the adjusted throttle command 54 received from the electronic control module 16 and sensor data 28 received from a motor output sensor 48. For example, in an exemplary embodiment of the system 10 of the vehicle 12, the system 10 includes a drivetrain 42 that has an electric motor 22 configured to drive rotation of a wheel 38 of the vehicle 12, an input device 14, an electronic control module 16, a first sensor 44 that is configured to sense an output of the electric motor 22, and an inverter 18 having control circuitry 20. In operation of the exemplary embodiment, the input device 14 receives an input and outputs an initial throttle command 52 in response to the received input. The electronic control module 16 receives the initial throttle command 52 from the input device 14 and outputs an adjusted throttle command 54. The adjusted throttle command 54 is determined based on the natural frequency of the drivetrain 42 and the application of a moving average filter 56 to the initial throttle command 52. The first sensor 44 of the system 10 senses an output of the electric motor 22 and transmits corresponding sensor data 28 to the control circuitry 20 of the inverter 18. The control circuitry 20 receives the sensor data 28 pertaining to the output of the electric motor 22 from the first sensor 44 and the adjusted throttle command 54 from the electronic control module 16 and controls power supplied to the electric motor 22 based on the sensor data 28 and the adjusted throttle command 54 to counter torsional wind-up of the drivetrain 42, either preemptively or actively.

In various implementations of the exemplary embodiment of the system 10, the control circuitry 20 controls the power by adjusting the current supplied to the electric motor 22 based on the sensed output of the electric motor 22 indicated by the sensor data 28 of the first sensor 44. In some examples, the sensor data 28 of the first sensor 44 is communicated to the control circuitry 20 of the inverter 18 directly without first being relayed to the electronic control module 16 from which the adjusted throttle command 54 is received by the control circuitry 20. The sensor data 28 being received by the control circuitry 20 of the inverter 18 without having the electronic control module 16 acting as an intermediary may reduce the amount of time that it takes for the system 10 to counter torsional wind-up in the drivetrain 42.

In the aforementioned exemplary embodiment as well as various other embodiments of the system 10, the control circuitry 20 associated with the inverter 18 may control the power supplied to the electric motor 22 based on a variety of additional parameters. For example, in some embodiments, the control circuitry 20 may control the power supplied to the electric motor 22 based on the acceleration of the electric motor 22. The acceleration of the electric motor 22 may be determined from the sensor data 28 received from the first sensor 44 via processing of the sensor data 28 by the control circuitry 20. In some embodiments, the control circuitry 20 may control the power supplied to the electric motor 22 based on a predetermined slew rate with respect to the adjusted throttle command 54. In other words, the control circuitry 20 and/or the inverter 18 may dictate a slew rate, or a set rate at which the inverter 18 can change the current of the power supplied to the electric motor 22 responsive to a change in the adjusted throttle command 54 received by the control circuitry 20. In some embodiments, the power supplied to the electric motor 22 may be controlled by the control circuitry 20 based on a predetermined maximum torque limit of the control circuitry 20. In various implementations, a predetermined maximum torque limit is set within logic of the control circuitry 20, and the control circuitry 20 limits the power supplied to the electric motor 22 by the inverter 18, such that the resulting torque of the electric motor 22 coheres with the constraint set by the predetermined maximum torque limit. It is contemplated that the control circuitry 20 may control the power supplied to the electric motor 22 based on a variety of additional or alternative parameters, in various implementations of the system 10.

Referring still to FIGS. 1 and 2, in some embodiments, the control circuitry 20 of the inverter 18 of the system 10 of the vehicle 12 is configured to control power supplied to the electric motor 22 based on the throttle command 26 received from the electronic control module 16, sensor data 28 received from a motor output sensor 48, and sensor data 28 received from a wheel output sensor 46. In an exemplary embodiment of the system 10, the system 10 includes an electric axle assembly 30 that includes an electric motor 22, a gear system 32 operably coupled with the electric motor 22 via a rotor shaft 34, a differential 36 operably coupled with the gear system 32, a half shaft 40 operably coupled with the differential 36, and a wheel 38 operably coupled with the half shaft 40. The system 10 further includes an input device 14, such as an accelerator pedal 50, an electronic control module 16, a first sensor 44 that senses an output of the electric motor 22, a second sensor 44 that senses an output of the wheel 38, and an inverter 18 that includes associated control circuitry 20.

In operation of the exemplary embodiment, the input device 14 receives an input, such as depression of the accelerator pedal 50 by a user, and outputs an initial throttle command 52 responsively to the electronic control module 16. The electronic control module 16 receives the initial throttle command 52 from the input device 14 and outputs an adjusted throttle command 54. The first sensor 44 senses an output of the electric motor 22 of the electric axle assembly 30, and the second sensor 44 senses an output of the wheel 38 of the electric axle assembly 30. The control circuitry 20 of the inverter 18 receives the adjusted throttle command 54 from the electronic control module 16 and receives the sensor data 28 from the first sensor 44, as well as the sensor data 28 from the second sensor 44. The control circuitry 20 controls the power supplied to the electric motor 22 by the inverter 18 based on the adjusted throttle command 54 and the sensor data 28 from the first and second sensors 44 to counter torsional wind-up of the electric axle assembly 30.

In various implementations, the control circuitry 20 controls the power to counter torsional wind-up by adjusting the current supplied to the electric motor 22 in order to adjust the torque applied by the electric motor 22 based on the sensed output of the electric motor 22 indicated by the sensor data 28 of the first sensor 44 relative to the sensed output of the wheel 38 indicated by the sensor data 28 of the second sensor 44. In other words, in operation of the vehicle 12, torque jumps associated with driving events, such as acceleration, result in the speed and/or angular position of the electric motor 22 being ahead of and generally out of sync with the speed and/or angular position of the wheel 38 that is driven by the electric motor 22. The first and second sensors 44 sense the speeds and/or positions of the electric motor 22 and wheel 38, respectively, and the control circuitry 20 controls the power based on the sensed output of the electric motor 22 relative to the sensed output of the wheel 38 in order to counter, either preemptively or actively, torsional wind-up of the electric axle assembly 30. In some implementations, the control circuitry 20 controls the power supplied to the electric motor 22 by the inverter 18 by adjusting the current in order to reverse the direction of the torque applied by the electric motor 22 and/or adjust the magnitude of the torque applied by the electric motor 22 based on the sensor data 28 of the first sensor 44 and the sensor data 28 of the second sensor 44 indicating that the output of the electric motor 22 is relatively ahead of the output of the wheel 38 due to torsional wind-up of the electric axle assembly 30. In this way, torque can be injected into the drivetrain 42 that counters the torsional wind-up via control of the power supplied to the electric motor 22 by the inverter 18. In the exemplary embodiment, the sensor data 28 of the first sensor 44 and the sensor data 28 of the second sensor 44 may be communicated to the control circuitry 20 of the inverter 18 without first being relayed to the electronic control module 16 from which the adjusted throttle command 54 is received by the control circuitry 20, which may increase the efficiency and efficacy of the system 10.

Figure 3:
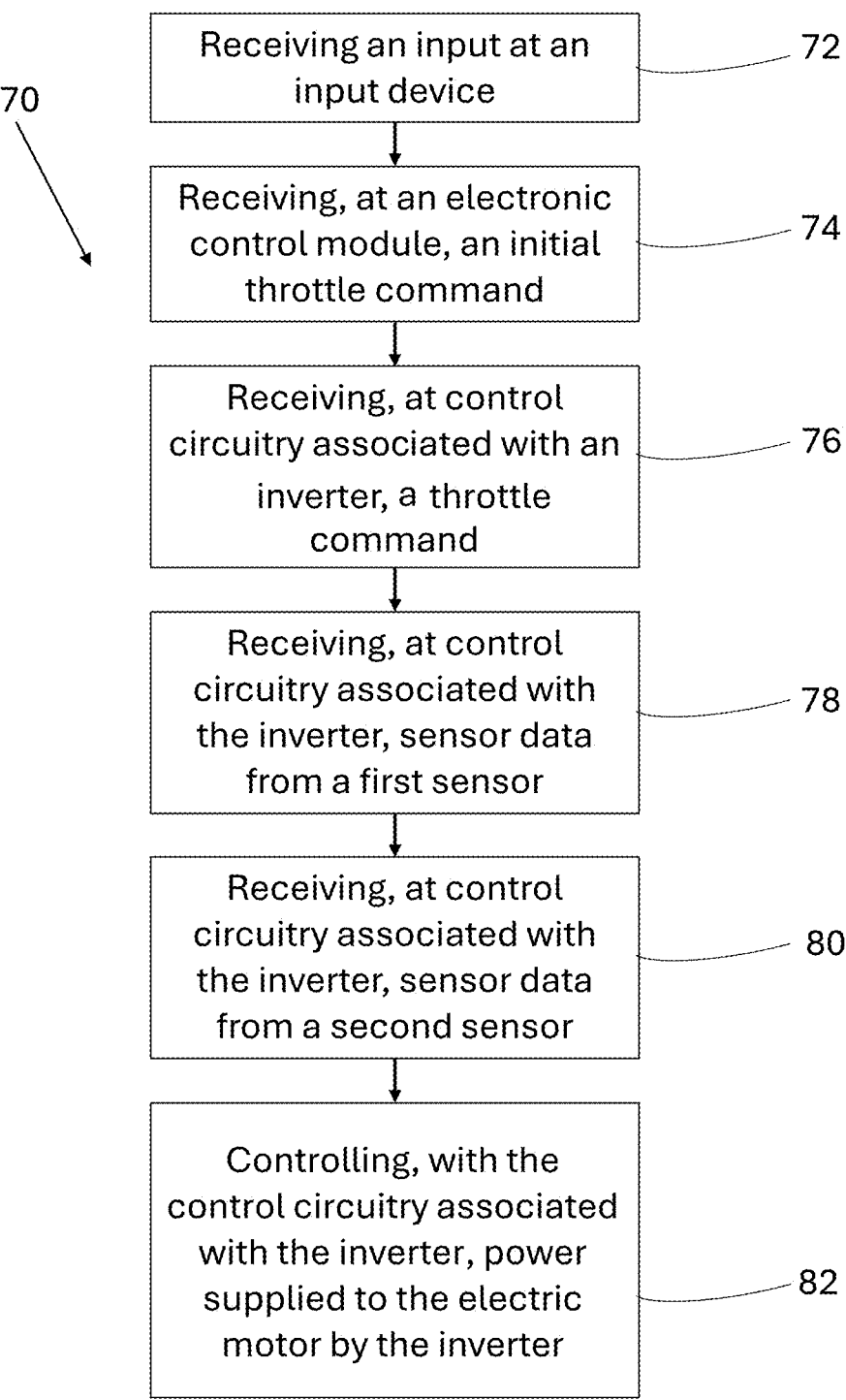
FIG. 3 is a diagram of a method of controlling a vehicle, according to one embodiment.

Referring now to FIG. 3, a method 70 for controlling operation of the vehicle 12 is illustrated. The method 70 may include a step 72 of receiving an input at an input device 14 of the vehicle 12. In various embodiments, the input device 14 may be an accelerator pedal 50 or other feature that is configured to receive an input from the user of the vehicle 12. A variety of types of input devices 14 are contemplated. The method 70 may further include a step 74 of receiving, at the electronic control module 16, an initial throttle command 52. The initial throttle command 52 may be received at the electronic control module 16 from the input device 14 in response to the input device 14 receiving the input.

Referring still to FIG. 3, the method 70 may include a step 76 of receiving, at control circuitry 20 associated with an inverter 18 of the vehicle 12, a throttle command 26. In various implementations, the throttle command 26 may be received from the electronic control module 16. Further, the throttle command 26 may be an adjusted throttle command 54 that is based on the initial throttle command 52, as described herein. The method 70 may include a step of receiving 78, at the control circuitry 20 associated with the inverter 18 of the vehicle 12, sensor data 28 from a first sensor 44 that senses an output of the electric motor 22 of the vehicle 12. The method 70 may include a step 80 of receiving, at the control circuitry 20 associated with the inverter 18 of the vehicle 12, sensor data 28 from a second sensor 44 that senses an output of a wheel 38 of the vehicle 12.

As illustrated in FIG. 3, the method 70 may further include a step 82 of controlling, with the control circuitry 20 associated with the inverter 18, power supplied to the electric motor 22 by the inverter 18 based on the sensor data 28 received from the first sensor 44 and the sensor data 28 received from the second sensor 44 to counter torsional wind-up of an electric axle assembly 30 that includes the electric motor 22. In some implementations of the method 70, the step 82 of controlling the power to counter torsional wind-up comprises adjusting the current supplied to the electric motor 22 to reverse the direction of torque applied by the electric motor 22 and/or alter the magnitude of the torque applied by the electric motor 22.

During an acceleration event of the vehicle 12, the output of the wheel 38 (e.g., speed, angular position, etc.) can lag behind (with respect to a torsional equilibrium of the electric axle assembly 30) the output of the electric motor 22 as the electric axle assembly 30 winds up. Typically, when an axle winds up in this manner, the axle subsequently unwinds and continues to twist beyond the torsional equilibrium point of the axle, creating wind-up in the opposite direction. When this occurs, the output of the motor lags behind the output of the wheel with respect to the torsional equilibrium of the axle. In some implementations of the method 70, upon the occurrence of initial wind-up of the electric axle assembly 30 wherein the output of the wheel 38 lags behind the output of electric motor 22, the control circuitry 20 controls the power supplied to the electric motor 22 by adjusting the current supplied to the electric motor 22 to reverse the direction of the torque applied by the electric motor 22 and/or alter the magnitude of the torque applied by the electric motor 22 prior to unwinding of the electric axle assembly 30 beyond the torsional equilibrium wherein the output of the electric motor 22 lags behind the output of the wheel 38. In other words, the control circuitry 20 controls the power supplied to the electric motor 22 by the inverter 18 by adjusting the current to reverse the direction of and/or alter the magnitude of torque applied by the electric motor 22 prior to the output of the wheel 38 exceeding the output of the electric motor 22 with respect to torsional equilibrium of the electric axle assembly 30. As such, the surging and pulsing that often occurs in electric vehicles 12 as the axle assembly 30 rebounds beyond a point of torsional equilibrium may be preemptively addressed by the quality of the power supplied to the electric motor 22. In the method 70, the sensor data 28 received from the first sensor 44 and sensor data 28 received from the second sensor 44 may be communicated between the control circuitry 20 and the first and second sensors 44, respectively, without first being relayed to the electronic control module 16 from which the throttle command 26 is received by the control circuitry 20.

Referring now to FIG. 4, a method 90 of controlling a vehicle 12 is illustrated. The method 90 of controlling the vehicle 12 may include a step 92 of receiving, at an electronic control module 16, an initial throttle command 52 from an input device 14 responsive to the input device 14 receiving an input. The method 90 may include a step 94 of generating, via the electronic control module 16, an adjusted throttle command 54 based on a natural frequency of a drivetrain 42 of the vehicle 12. In some implementations, the step 94 of generating the adjusted throttle command 54 is based on application of a moving average filter 56 to the initial throttle command 52. It is contemplated that the adjusted throttle command 54 may be adjusted relative to the initial throttle command 52 based on a variety of parameters and/or filters, in various embodiments. The method 90 of controlling the vehicle 12 may further include a step 96 of sensing, via a first sensor 44, an output of an electric motor 22 of the drivetrain 42 configured to drive rotation of a wheel 38 of the vehicle 12. A variety of outputs of the electric motor 22 (i.e., position, speed, etc.) are contemplated, as described herein. The method 90 may include a step 98 of receiving, at control circuitry 20 associated with an inverter 18, sensor data 28 from the first sensor 44 and the adjusted throttle command 54 from the electronic control module 16. As illustrated in FIG. 4, the method 90 may include a step 100 of controlling power supplied to the electric motor 22 by the inverter 18 based on the sensor data 28 and the adjusted throttle command 54. In various implementations, the power supplied to the electric motor 22 is controlled via the control circuitry 20 such that torque output by the electric motor 22 counters low-frequency speed oscillations of the vehicle 12.

The system and methods of the present disclosure may provide a variety of advantages. First, the control circuitry 20 controlling the power supplied to the electric motor 22 by the inverter 18 based on an adjusted throttle command 54 and sensor data 28 from sensors 44 sensing the output of the electric motor 22 and/or a wheel 38 of the vehicle 12 may result in improved low-frequency speed oscillation mitigation relative to conventional systems. Second, the sensor data 28 from the first and/or second sensors 44 of the system 10 being received by the control circuitry 20 associated with the inverter 18 without first being relayed to the electronic control module 16 of the system 10 may increase the efficiency and efficacy of the system 10 with regard to countering torsional wind-up of the electric axle assembly 30 of the vehicle 12.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 system
12 vehicle
14 input device
16 electronic control module
18 inverter
20 control circuitry
22 electric motor
24 sensing system
26 throttle command
28 sensor data
30 electric axle assembly
32 gear system
34 rotor shaft
36 differential
38 wheel
40 half shafts
42 drivetrain
44 sensors
46 wheel output sensor
48 motor output sensor
50 accelerator pedal
52 initial throttle command
54 adjusted throttle command
56 moving average filter
58 torque curve filter
70 method
72 step of receiving an input
74 step of receiving an initial throttle command
76 step of receiving, at control circuitry, a throttle command
78 step of receiving sensor data from a first sensor
80 step of receiving sensor data at a second sensor
82 step of controlling power
90 method
92 step of receiving initial throttle command
94 step of generating adjusted throttle command
96 step of sensing, via first sensor, an output of electric motor 98 step of receiving, at control circuitry, sensor data from a first sensor
100 step of controlling power

What is claimed is:

1. A vehicle system, comprising:
an electric axle assembly that includes an electric motor, a gear system operably coupled with the electric motor via a rotor shaft, a differential operably coupled with the gear system, a half shaft operably coupled with the differential, and a wheel operably coupled with the half shaft;
an input device that receives an input and outputs an initial throttle command responsively;
an electronic control module that receives the initial throttle command from the input device and outputs an adjusted throttle command;
a first sensor that senses an output of the electric motor;
a second sensor that senses an output of the wheel; and
an inverter having control circuitry that receives the adjusted throttle command from the electronic control module and receives sensor data from the first sensor and sensor data from the second sensor, wherein the control circuitry controls power supplied to the electric motor based on the adjusted throttle command and the sensor data from the first and second sensors to counter torsional wind-up of the electric axle assembly.

2. The vehicle system of claim 1, wherein the control circuitry controls the power to counter torsional wind-up by adjusting the current supplied to the electric motor to adjust the torque applied by the electric motor based on the sensed output of the electric motor indicated by the sensor data of the first sensor relative to the sensed output of the wheel indicated by the sensor data of the second sensor.

3. The vehicle system of claim 2, wherein the control circuitry controls the power by adjusting the current supplied to the electric motor to at least one of reverse the direction of the torque applied by the electric motor and adjust the magnitude of the torque applied by the electric motor based on the sensor data of the first sensor and the sensor data of the second sensor indicating that the output of the electric motor is relatively ahead of the output of the wheel due to torsional wind-up of the electric axle assembly of the vehicle system.

4. The vehicle system of claim 3, wherein the output of the wheel is at least one of speed, acceleration, and angular position.

5. The vehicle system of claim 1, wherein the sensor data of the first sensor and the sensor data of the second sensor is communicated to the control circuitry of the inverter directly without first being relayed to the electronic control module from which the adjusted throttle command is received by the control circuitry.

6. A vehicle system, comprising:
an electric axle assembly that includes an electric motor, a gear system operably coupled with the electric motor via a rotor shaft, a differential operably coupled with the gear system, a half shaft operably coupled with the differential, and a wheel operably coupled with the half shaft;
a first sensor that senses an output of the electric motor;
a second sensor that senses an output of the wheel; and
an inverter that supplies power to the electric motor and includes control circuitry that controls the power supplied to the electric motor based on the sensed output of the electric motor and the sensed output of the wheel to adjust operation of the electric motor.

7. The vehicle system of claim 6, wherein the control circuitry controls the power to counter torsional wind-up by adjusting the current supplied to the electric motor to adjust the torque applied by the electric motor based on the sensed output of the electric motor relative to the sensed output of the wheel.

8. The vehicle system of claim 7, wherein the control circuitry controls the power by adjusting the current supplied to the electric motor to at least one of reverse the direction of torque applied by the electric motor and adjust the magnitude of the torque applied by the electric motor based on sensor data of the first and second sensors indicating that the output of the electric motor is relatively ahead of the output of the wheel due to torsional wind-up of the electric axle assembly of the vehicle system.

9. The vehicle system of claim 6, further comprising:

an electronic control module that is configured to output a throttle command to the control circuitry of the inverter, wherein the control circuitry is configured to control the power supplied to the electric motor by the inverter based on the received throttle command and the sensed outputs of the electric motor and wheel, respectively.

10. The vehicle system of claim 9, further comprising:

an accelerator pedal that is configured to receive an input from a user of the vehicle system and output an initial throttle command to the electronic control module, wherein the throttle command output by the electronic control module is an adjusted throttle command based on the initial throttle command.

11. The vehicle system of claim 9, wherein the first and second sensors respectively communicate sensor data to the control circuitry of the inverter directly without first relaying the sensor data to the electronic control module.

12. A method of controlling movement of a vehicle, comprising the steps of:

receiving, at control circuitry associated with an inverter of the vehicle, sensor data from a first sensor that senses an output of an electric motor of the vehicle;

receiving, at the control circuitry associated with the inverter of the vehicle, sensor data from a second sensor that senses an output of a wheel of the vehicle; and controlling, with the control circuitry associated with the inverter, power supplied to the electric motor by the inverter based on the sensor data received from the first sensor and the sensor data received from the second sensor to counter torsional wind-up of an electric axle assembly that includes the electric motor.

13. The method of claim 12, wherein controlling the power to counter torsional wind-up comprises adjusting the current supplied to the electric motor to at least one of reverse the direction of the torque applied by the electric motor and adjust the magnitude of the torque being applied by the electric motor.

14. The method of claim 13, further comprising the step of:

receiving, at the control circuitry associated with the inverter, a throttle command from an electronic control module of the vehicle.

15. The method of claim 14, wherein the control circuitry controls the power supplied to the electric motor by adjusting the current supplied to the electric motor to at least one of reverse the direction of the torque applied by the electric motor and adjust the magnitude of the torque applied by the electric motor prior to the output of the wheel exceeding the output of the electric motor based on the sensor data received from the first sensor and the sensor data received from the second sensor.

16. The method of claim 15, wherein the control circuitry controls the power supplied to the electric motor by adjusting the current supplied to the electric motor to at least one of reverse the direction of the torque applied by the electric motor and adjust the magnitude of the torque applied by the electric motor prior to the output of the wheel exceeding the output of the electric motor based on the sensor data received from the first sensor and the sensor data received from the second sensor indicating that, relative to a point of torsional equilibrium of the electric axle assembly, the output of the electric motor is ahead of the output of the wheel.

17. The method of claim 14, wherein both the sensor data received from the first sensor and the sensor data received from the second sensor is communicated between the control circuitry and the first and second sensors, respectively, without first being relayed to the electronic control module from which the throttle command is received by the control circuitry.

18. The method of claim 14, wherein the throttle command is an adjusted throttle command that is based on an initial throttle command received at the electronic control module via an input device of the vehicle.

19. The method of claim 18, wherein the input device is an accelerator pedal.

20. The method of claim 12, wherein the electric axle assembly includes the electric motor and the wheel.

* * * * *